(12) United States Patent
Severien et al.

(10) Patent No.: US 6,429,559 B1
(45) Date of Patent: Aug. 6, 2002

(54) ELECTRIC MOTOR INTENDED FOR USE IN HIGH-TEMPERATURE ENVIRONMENTS

(75) Inventors: Herbert Severien, Schwalbach; Eugen Bernarding, Usingen, both of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/618,418

(22) Filed: Jul. 18, 2000

(30) Foreign Application Priority Data

Jul. 20, 1999 (DE) .......................... 199 33 999

(51) Int. Cl.$^7$ .............................. H02K 5/04; H02K 1/04
(52) U.S. Cl. ............................................. 310/89; 310/43
(58) Field of Search ...................................... 310/89, 43

(56) References Cited

U.S. PATENT DOCUMENTS 4,823,032 A * 4/1989 Ward ............................ 310/43
5,731,646 A * 3/1998 Heinze ......................... 310/89
5,977,669 A * 11/1999 Yoshida ........................ 310/68
6,031,306 A * 2/2000 Permuy ........................ 310/89

FOREIGN PATENT DOCUMENTS

| CH | 396185 | 9/1961 |
| DE | 539109 | 11/1931 |
| DE | 3933067 | 4/1990 |

* cited by examiner

*Primary Examiner*—Nestor Ramrez
*Assistant Examiner*—Karen Addison
(74) *Attorney, Agent, or Firm*—Martin A. Farber

(57) ABSTRACT

In an electric motor, one one bearing plate (4) is made of plastic. A heat dissipation plate (9) is arranged a short distance in front of that side of the bearing plate (4) which faces the interior of the electric motor. The heat dissipation plate (9) carries heat from a bearing (5) to an electric motor housing (6), which is made of metal. This allows the electric motor to be manufactured particularly cost-effectively.

14 Claims, 1 Drawing Sheet

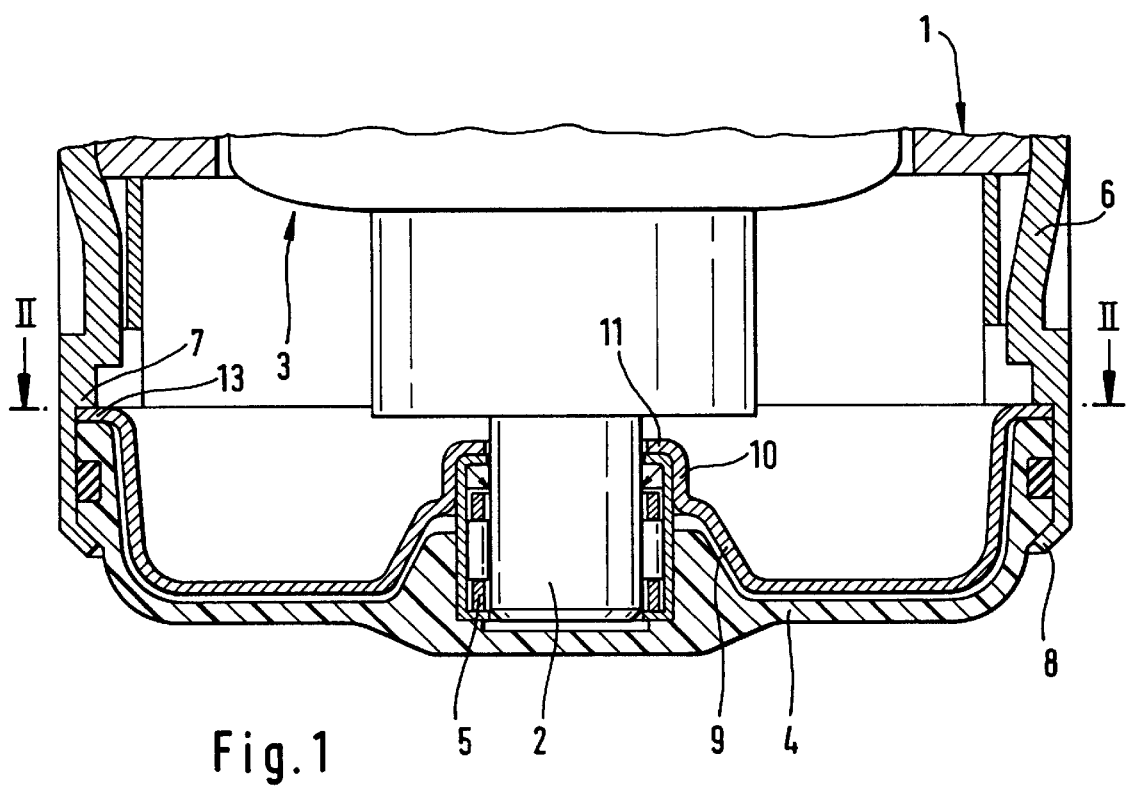
Fig. 1
Fig. 2
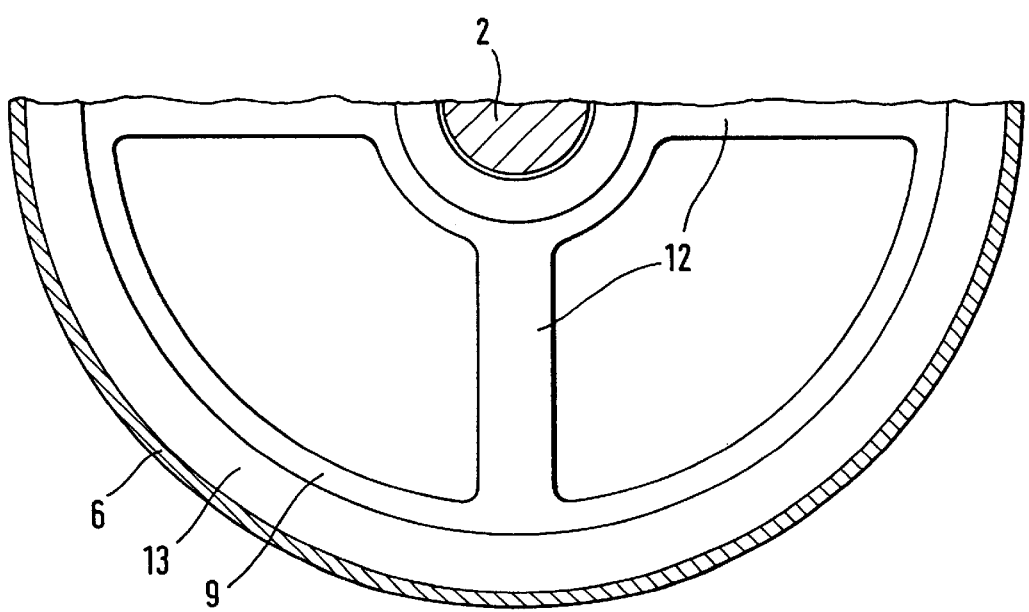

ELECTRIC MOTOR INTENDED FOR USE IN HIGH-TEMPERATURE ENVIRONMENTS

FIELD OF THE INVENTION

The invention relates to an electric motor intended for use in high-temperature environments and having a stator, having a rotor which is arranged in a rotationally fixed manner on a shaft, having bearing plates which each have one bearing for the shaft, and having a tubular housing on whose end faces the bearing plates are mounted, with the housing being produced from a highly thermally conductive material.

Such electric motors are often used close to or on an internal combustion engine in motor vehicles, and are known from practice. The housing is in this case manufactured as a tube closed at the rear, for example from sheet steel. When the electric motor is used in high-temperature environments, the heat which is produced as a result of operation of the electric motor accumulates inside the housing. The bearing plates are therefore made of aluminum and dissipate the heat produced inside the electric motor to the tubular housing. The housing is thus used to dissipate the heat produced during operation of the electric motor, for example to a bodywork part or to a component of the internal combustion engine in the motor vehicle.

A disadvantageous feature of the known electric motor is that it is highly costly to manufacture. For example, the bearing plates of the known electric motor are first of all produced by die casting from aluminum. The holders for one of the bearings and a connection for the housing are then turned.

SUMMARY OF THE INVENTION

The invention is based on the problem of refining an electric motor of the type mentioned initially such that it can be manufactured particularly cost-effectively.

This problem is solved in that at least one of the bearing plates is made of plastic and has a heat dissipation plate on its end facing the rotor.

This refinement of the electric motor according to the invention leads to a major reduction in the material costs for the bearing plate, since the heat dissipation plate can be designed with considerably thinner walls than the aluminum bearing plate. Furthermore, the plastic for the bearing plate can be manufactured with particularly tight tolerances, so that there is no longer any need for costly reworking on lathes. The electric motor according to the invention can thus be manufactured particularly cost-effectively.

According to another advantageous development of the invention, the plastic bearing plate is subjected to a particularly low heat load if the heat dissipation plate is at a distance from the bearing plate in the region of the bearing.

According to another advantageous development of the invention, reliable heat transfer from the bearing of the bearing plate to the heat dissipation plate can easily be ensured if the heat dissipation plate is pressed against the bearing.

According to another advantageous development of the invention, the heat transfer from the bearing to the heat dissipation plate is further improved if the heat dissipation plate has a collar in the form of a sleeve for pressing against the bearing.

According to another advantageous development of the invention, heat produced inside the housing is reliably kept away from the bearing if the collar has a rim which faces radially inward and engages over the bearing. This rim is used as a cover for the bearing and can be continued to a point immediately in front of the shaft.

According to another advantageous development of the invention, reliable heat transfer from the heat dissipation plate to the tubular housing can easily be ensured if a circumferential rim of the heat dissipation plate is clamped axially between the bearing plate and the tubular housing.

The heat dissipation plate could, for example, be made of aluminum. However, according to another advantageous development of the invention, it is possible to ensure that the bearing is reliably and permanently pressed against the heat dissipation plate if the heat dissipation plate is made of copper. If the heat dissipation plate is made of copper and the bearing is made of steel, the two components have approximately the same coefficients of thermal expansion, so that the push fit of the components is not loaded by temperature fluctuations.

The heat dissipation plate could, for example, have an annular shape. However, according to another advantageous development of the invention, the heat dissipation plate has a particularly low weight if the collar, which is in the form of a sleeve, and that rim of the heat dissipation plate which is prestressed against the housing are connected to one another via webs. This also contributes to a further reduction in the material costs of the electric motor according to the invention.

According to another advantageous development of the invention, the plastic of the bearing plate can withstand particularly high temperatures if the plastic of the bearing plate hardens chemically.

BRIEF DESCRIPTION OF THE DRAWING

The invention allows numerous embodiments. In order to explain its basic principle further, one of these embodiments will be described in the following text and is illustrated in the figures of the drawing, in which FIG. 1 shows a section view of one end piece of an electric motor according to the invention, and FIG. 2 shows a section view through the electric motor from FIG. 1, along the line II—II.

DETAILED DESCRIPTION OF THE PREFERRED EMBODIMENT

FIG. 1 shows a longitudinal section through one end piece of an electric motor having a stator 1 and having a rotor 3 which is arranged in a rotationally fixed manner on a shaft 2 which can rotate. The shaft 2 is mounted in bearings 5 arranged on bearing plates 4. The drawing shows just one bearing plate 4 arranged on one end piece, thus representing the two bearing plates 4 respectively in each end piece. The housing motor has a tubular housing 6 which is in the form of a body, closed at the rear, for the stator 1. The housing 6 is made of sheet steel. The bearing plate 4 is made of a plastic which hardens chemically and is clamped in the housing 6. In order to clamp the bearing plate 4, the housing 6 has a step 7 and a collar 8 which engages behind and is beaded over the bearing plate 4. A rim 13 of the heat dissipation plate 9 is clamped in between the bearing plate 4 and the step 7 on the housing 6. The heat dissipation plate 9 extends as far as the bearing 5, and is pressed against it. To this end, the heat dissipation plate 9 has a collar 10 in the form of a sleeve. A rim 11 which faces radially inward and continues to a point immediately in front of the shaft 2 is adjacent to the collar 10, which is in the form of a sleeve.

FIG. 1 also shows that the heat dissipation plate 9 and the bearing plate 4 are at a distance from one another in their radially inner region. Heat produced in the electric motor is transmitted from the bearing 5 to the heat dissipation plate 9, from where it is dissipated to the housing 6. This keeps high temperatures away from the bearing plate 4, avoiding high temperature loading of the bearing 5.

In a section view along the line II—II from FIG. 1, FIG. 2 shows that the radially inner and the radially outer regions of the heat dissipation plate 9 are connected to one another via webs 12. This results in the heat dissipation plate 9 having a particularly low weight.

What is claimed is:

1. An electric motor intended for use in high-temperature environments, comprising a stator, a rotor which is arranged in a rotationally fixed manner on a shaft, bearing plates which each have one bearing for the shaft, and a tubular housing on end faces of which the bearing plates are respectively mounted, the housing being made of a highly thermally conductive material, wherein at least one of the bearing plates (4) is made from plastic and has a heat dissipation plate (9) on an end thereof facing the rotor (3), wherein the heat dissipation plate (9) is at a distance from the bearing plate (4) in a region of the bearing (5).

2. The electric motor as claimed in claim 1, wherein the heat dissipation plate (9) is pressed against the bearing (5).

3. The electric motor as claimed in claim 1, wherein the heat dissipation plate (9) has a collar in form of a sleeve for pressing against the bearing.

4. The electric motor as claimed in claim 3, wherein the collar (10) has a rim which faces radially inward and engages over the bearing (5).

5. An electric motor intended for use in high-temperature environments, comprising a stator, a rotor which is arranged in a rotationally fixed manner on a shaft, bearing plates which each have one bearing for the shaft, and a tubular housing on end faces of which the bearing plates are respectively mounted, the housing being made of a highly thermally conductive material, wherein at least one of the bearing plates (4) is made from plastic and has a heat dissipation plate (9) on an end thereof facing the rotor (3), wherein a circumferential rim (13) of the heat dissipation plate (9) is clamped in axially between the bearing plate (4) and the tubular housing (6).

6. The electric motor as claimed in claim 1, wherein the heat dissipation plate (9) is made of copper.

7. The electric motor as claimed in claim 1, wherein the heat dissipation plate has a collar and a rim, wherein the collar (10), which is in form of a sleeve, and the rim (13) of the heat dissipation plate (9) which is prestressed against the housing (6) are connected to one another via webs (12).

8. The electric motor as claimed in claim 1, wherein the plastic of the bearing plate (4) hardens chemically.

9. The electric motor as claimed in claim 5, wherein the heat dissipation plate (9) is pressed against the bearing (5).

10. The electric motor as claimed in claim 5, wherein the heat dissipation plate (9) has a collar in form of a sleeve for pressing against the bearing.

11. The electric motor as claimed in claim 10, wherein the collar (10) has a rim which faces radially inward and engages over the bearing (5).

12. The electric motor as claimed in claim 5, wherein the heat dissipation plate (9) is made of copper.

13. The electric motor as claimed in claim 5, wherein the heat dissipation plate has a collar and a rim, wherein the collar (10), which is in form of a sleeve, and the rim (13) of the heat dissipation plate (9) which is prestressed against the housing (6) are connected to one another via webs (12).

14. The electric motor as claimed in claim 5, wherein the plastic of the bearing plate (4) hardens chemically.

* * * * *